(12) United States Patent
Bradley et al.

(10) Patent No.: US 10,069,842 B1
(45) Date of Patent: *Sep. 4, 2018

(54) SECURE RESOURCE ACCESS BASED ON PSYCHOMETRICS

(71) Applicant: INTERNATIONAL BUSINESS MACHINES CORPORATION, Armonk, NY (US)

(72) Inventors: Lisa M. Bradley, Cary, NC (US); Liam Harpur, Dublin (IE); Vivek Jain, Maharashtra (IN); Mahesh S. Paradkar, Pune (IN); Aaron J. Quirk, Raleigh, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,507

(22) Filed: Sep. 14, 2017

Related U.S. Application Data

(63) Continuation of application No. 15/458,062, filed on Mar. 14, 2017.

(51) Int. Cl.
*G06F 21/00* (2013.01)
*H04L 29/06* (2006.01)
(Continued)

(52) U.S. Cl.
CPC ........ *H04L 63/105* (2013.01); *G06F 17/2785* (2013.01); *G06F 17/30867* (2013.01);
(Continued)

(58) Field of Classification Search
None
See application file for complete search history.

(56) References Cited

U.S. PATENT DOCUMENTS

| 4,142,067 A | 2/1979 | Williamson |
| 5,601,090 A | 2/1997 | Musha |

(Continued)

FOREIGN PATENT DOCUMENTS

| CN | 102874259 B | 12/2015 |
| EP | 1629617 B1 | 7/2011 |

(Continued)

OTHER PUBLICATIONS

Haran, "Human Behavior Analysis: The Next Big Thing?", http://www.bankinfosecurity.com/blogs/human-behavior-analysis-next-big-thing-p-1937/, printed Sep. 16, 2015, pp. 1-6.

(Continued)

*Primary Examiner* — Maung T Lwin
(74) *Attorney, Agent, or Firm* — Minh-Hien Vo

(57) ABSTRACT

Access to a secure resource is controlled. Data relating to social media history information, demographic information, and psychometric information regarding a user having access to a secure resource is mined by a computer system. Mined data that indicates a potential security risk that meets a predefined security criteria with respect to the secure resource is identified by the computer system. A security risk level based on the identified data is determined. A level of access to the secure resource by the user computing device is set, based on one or more predetermined threshold values that are met, in response to a determination regarding such. Access is granted to the secure resource in accordance with the set level of access, in response to receiving a request to access the secure resource by the computer system.

1 Claim, 5 Drawing Sheets

(51) Int. Cl.
*G06F 17/27* (2006.01)
*G06F 17/30* (2006.01)

(52) U.S. Cl.
CPC ...... *H04L 63/0281* (2013.01); *H04L 63/0884* (2013.01); *G06F 2216/03* (2013.01)

(56) References Cited

U.S. PATENT DOCUMENTS

| | | | |
|---|---|---|---|
| 7,117,032 | B2 | 10/2006 | Childre et al. |
| 7,278,163 | B2 | 10/2007 | Banzhof et al. |
| 7,461,036 | B2 * | 12/2008 | Genty ................ G06N 3/02 706/15 |
| 9,430,570 | B2 * | 8/2016 | Button ................ G06N 5/043 |
| 2002/0138271 | A1 | 9/2002 | Shaw |
| 2006/0047515 | A1 | 3/2006 | Connors |
| 2007/0048706 | A1 | 3/2007 | Tan |
| 2008/0096532 | A1 | 4/2008 | Lyle et al. |
| 2008/0288330 | A1 | 11/2008 | Hildebrand et al. |
| 2009/0306979 | A1 | 12/2009 | Jaiswal et al. |
| 2010/0050271 | A1 | 2/2010 | Saarisalo |
| 2010/0293130 | A1 * | 11/2010 | Stephan ............... G06F 19/18 706/52 |
| 2011/0061089 | A1 | 3/2011 | O'Sullivan et al. |
| 2012/0102050 | A1 * | 4/2012 | Button ............ G06F 17/30867 707/749 |
| 2013/0073473 | A1 * | 3/2013 | Heath ................ G06Q 30/02 705/319 |
| 2013/0282605 | A1 * | 10/2013 | Noelting ........... G06Q 10/1053 705/321 |
| 2015/0058273 | A1 | 2/2015 | Coden et al. |
| 2015/0350201 | A1 * | 12/2015 | Cornell .............. H04L 63/0861 726/7 |
| 2017/0046496 | A1 | 2/2017 | Johnstone et al. |
| 2017/0053089 | A1 * | 2/2017 | Kenedy ................ G16H 50/30 |

FOREIGN PATENT DOCUMENTS

| | | |
|---|---|---|
| EP | 2487860 A1 | 8/2012 |
| WO | 2013058964 A1 | 4/2013 |
| WO | 2016097998 A1 | 6/2016 |

OTHER PUBLICATIONS

Elena, "Risk Perception and Cloud Computing Security", University of Glasgow, UK, accessed on Mar. 29, 2016, pp. 1-10.

IBM Security, "Reviewing a Year of Serious Data Breaches, Major Attachks and New Vulnerabilities", Analysis of cyben attack and incident data from IBM's worldwide secuirty services operation, IBM X-Force Research, Cyber Security Intelligence Index, 2016, pp. 1-19.

Mell et al., "The NIST Definition of Cloud Computing", National Institute of Standards and Technology, Special Publication 800-145, Sep. 2011, pp. 1-7.

IBM, "List of IBM Patents or Patent Applications Treated as Related (Appendix P)," Feb. 2, 2018 p. 1-2.

U.S. Appl. No. 15/458,062, filed Mar. 14, 2017, entitled "Secure Resource Access Based on Psychometrics", 41 Pages.

* cited by examiner

SECURE RESOURCE ACCESS BASED ON PSYCHOMETRICS

BACKGROUND

The present invention relates generally to the field of information security, and more particularly to the prevention of unauthorized use or modification of data.

SUMMARY

Embodiments of the present invention are directed to a method, system, and computer program product for controlling access to a secure resource. Social media history information, demographic information, and psychometric information with respect to a user having access to a secure resource is mined by a computer system to retrieve information related to the user. A request to access a secure resource is received by the computer system from a user computing device. Data in the mined data that indicates a potential security risk that meets a predefined security criteria with respect to the secure resource is identified by the computer system. A security risk level based on the identified data is determined by the computer system. A level of access to the secure resource by the user computing device is set, based on one or more predetermined threshold values that are met, in response to determining by the computer system that the determined security risk level meets the one or more predetermined threshold values. Access is granted to the secure resource in accordance with the set level of access, in response to receiving a request to access the secure resource by the computer system.

DETAILED DESCRIPTION

Figure 1:
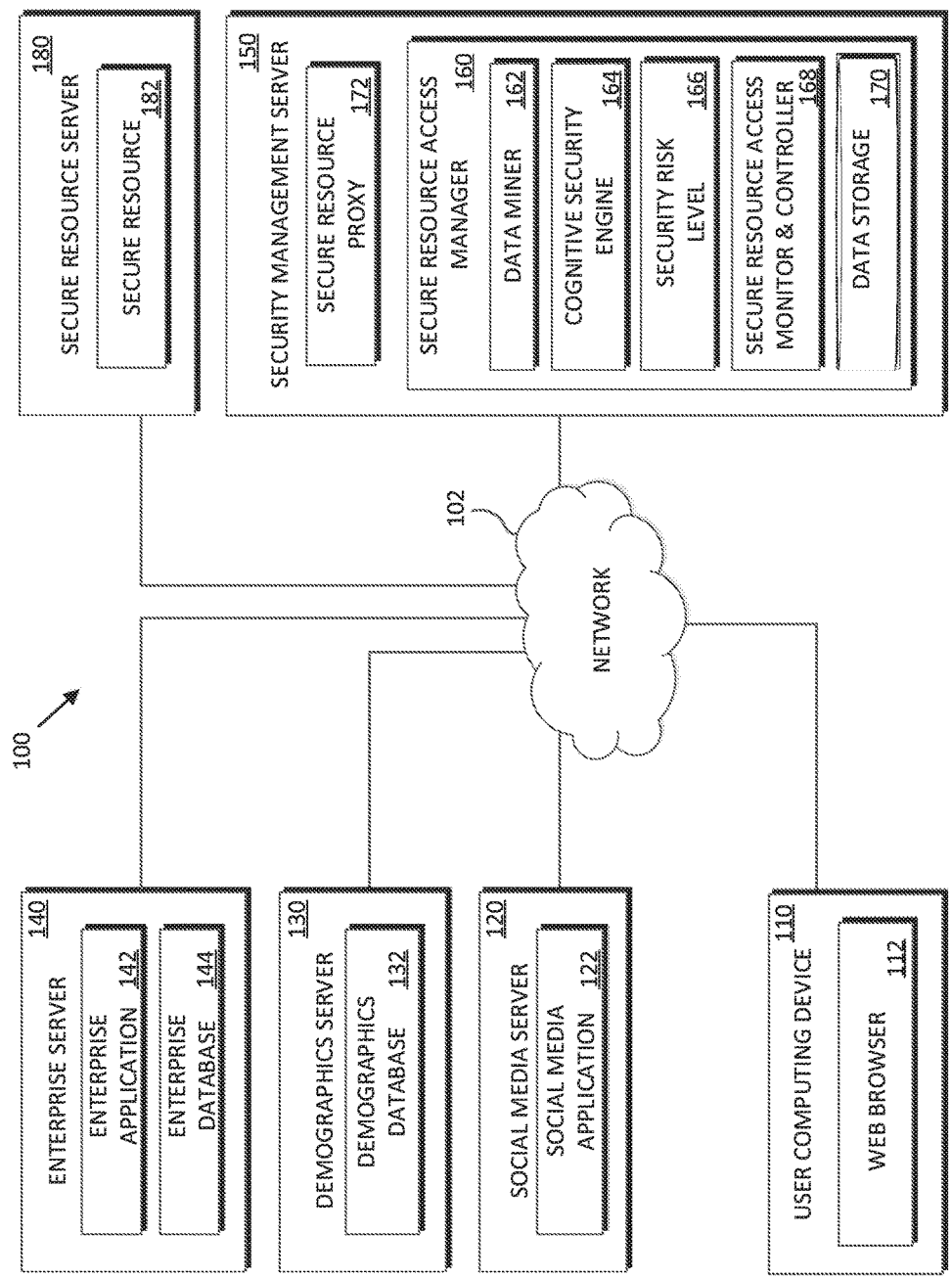
FIG. 1 is a functional block diagram depicting a security management system, in accordance with an embodiment of the present invention.

Data or information belonging to an enterprise may be sensitive, and may include, for example, intellectual property and other types of proprietary information, sensitive personal information such as personally identifiable information related to employees, contractors, and other personnel, amongst other types of information. An enterprise may secure sensitive information by requiring individuals or users to possess certain privileges or permissions in order to access the information. For example, a system administrator may define access restrictions to secure sensitive information, which may require users who request access to the secure information to possess certain privileges in order to gain access. Privileges may be given to users based on, for example, job roles, job functions, seniority, and assigned tasks to be completed. The proper handling of sensitive information may then rely on various human factors, such as the users' information security habits, discretion, or the like, who possess the required privileges to gain access to the sensitive information. Human factors with respect to a user may be variable, and may depend on, for example, psychometrics and demographics with respect to the user, as described in further detail below.

An individual who possesses the required privileges needed to gain access to sensitive information may still pose a potential security risk to the enterprise, since the individual may, with or without intent, act to collect, disrupt, distribute, degrade, or destroy the sensitive information, and/or information system resources belonging to the enterprise. For example, in some instances an individual may act with intent against an enterprise by destroying information belonging to the enterprise. In other instances, the individual may act without intent due to, for example, poor information security habits, by inadvertently opening an email attachment containing malicious software. Such acts by the individual, which may be described as various types of information security events, data breaches, and cyber-attacks, may result in, for example, financial and/or reputational losses for the enterprise. Such information security events accounted for 60 percent of all information security events encountered by enterprises worldwide in the year 2015, as reported by the IBM X-Force® 2016 Cyber Security Intelligence Index.

Indications of a potential security risk posed by an individual who can access sensitive information, or a secure resource, belonging to an enterprise, may occur as one or more patterns of behavior exhibited by the individual.

Embodiments of the present invention are directed to an information security system that controls access to secure resources, based on information relating to behavioral patterns and/or human factors of a requestor, or a user that requests access to the secure resources. The behavioral patterns and human factors of a requestor are determined based on mined psychometric information, demographic information, and social media history information of the requestor. A level of security risk is determined with respect to the requestor, and access to the secure resource is restricted accordingly.

FIG. 1 is a functional block diagram depicting a security management system 100, in accordance with an embodiment of the present invention. Security management system 100 may include user computing device 110, social media server 120, demographics server 130, enterprise server 140, security management server 150, and secure resource server 180, all interconnected over a network 102.

In various embodiments, network 102 represents, for example, an intranet, a local area network (LAN), a wide area network (WAN) such as the Internet, and include wired, wireless, or fiber optic connections. In general, network 102 can be any combination of connections and protocols that will support communications between each of user computing device 110, social media server 120, demographics server 130, enterprise server 140, security management server 150, and secure resource server 180 over one or more networks, that may include one or more private networks as well a public network, such as the Internet, in accordance with an embodiment of the invention.

Figure 3:
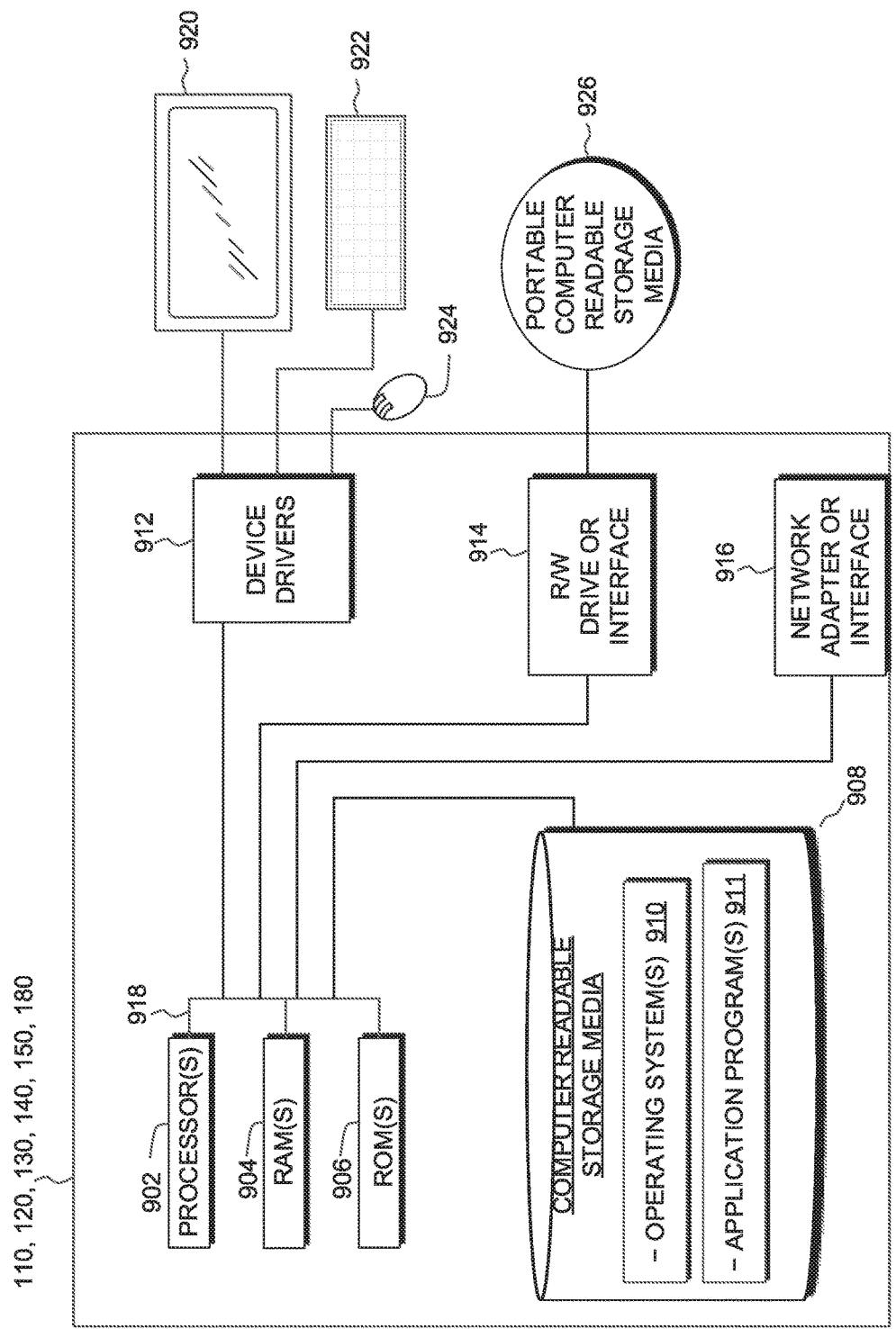
FIG. 3 is a block diagram depicting a computing device, in accordance with an embodiment of the present invention.

In various embodiments, user computing device 110, social media server 120, demographics server 130, enterprise server 140, security management server 150, and secure resource server 180 may be a laptop computer, desktop computer, computer server, or any other type of computing platform, computer system, or information system known in the art, in accordance with embodiments of the present invention, and may each include internal and external hardware components, as depicted and described in further detail below with reference to FIG. 3. In other embodiments, any one of, or any combination of the aforementioned computing platforms, may be implemented in a cloud computing environment, as described in relation to FIGS. 4 and 5, below.

Secure resource server 180 represents a computing platform that may host one or more enterprise secure resources, for example, secure resource 182.

In an exemplary embodiment, secure resource 182 may represent controlled-access resources that may belong to an enterprise. Controlled-access resources may include, for example, data or information, as described in further detail below, which may be accessed by way of a computer program. Secure resource 182 may also represent, either alternatively or in addition, controlled-access computer programs used by an enterprise, as described in further detail below. Secure resource 182 may be used by an enterprise to support the enterprise's various functions, activities, processes, or operations. Resources represented by secure resource 182 may include various types of data or information, and may be directed to one or more specific functions of an enterprise such as business and/or market intelligence and strategies, accounting, occupational safety and health, human resources, project management, and customer information management. Computer program resources represented by secure resource 182 may include various types of computer programs, for example, computer programs which may be used to modify the operation or functionality of operating systems or networks used by computing platforms of an enterprise. Secure resource 182 may be handled, or otherwise stored, accessed, communicated, and/or manipulated, with respect to secure resource server 180, by way of one or more database management systems, which may be hosted on secure resource server 180. Secure resource 182 may be made available for use by users under certain circumstances, as will be described in further detail below, where the users might include, for example, an enterprise's employees, contractors, and other personnel.

Social media server 120 represents a computing platform that may host one or more social media or social networking platforms, electronic mail or email platforms, and messaging platforms, for example, social media application 122.

In an exemplary embodiment, social media application 122 may represent social media platforms, such as, Facebook®, Twitter®, LinkedIn®, or may represent an email or messaging platform, such as, Gmail® or Gchat®. Social media application 122 may be used by a user once the user builds a user profile. A user profile of a user may include various demographic information, as described in further detail below, regarding the user, and may also include various other types of information regarding the user, for example, interests, hobbies, contact information, contacts, and/or various types of biographical information.

As a user uses social media application 122, a social media history is created. A user's social media history may include the user's activities on social media application 122 with one or more members of social networks, participation and activities by the user in one or more forums or common interest(s) groups, "likes", comments, message posts, and messages sent or received by the user. Social media history information may include information content uploaded by the user in various forms, including, for example, image files, video files, audio files, posts consisting of text or words and/or emoticons or "emojis". Social media application 122 may serve as sources of information which may be data mined, as described in further detail below, with respect to a user of secure resource 182.

Demographics server 130 represents a computing platform that may host one or more database management systems, for example, demographics database 132.

In an exemplary embodiment, demographics database 132 represents a database management system that may be used to host demographic information such as might be included in a census database. Demographics database 132 may be publically owned and maintained, for example, by the United States Census Bureau, or may be privately owned and maintained. The choice of the types of demographic information to mine with respect to individuals, and the choice of sources from which to mine the demographic information are a matter of design choice.

Enterprise server 140 represents a computing platform that may host one or more enterprise social media platforms, enterprise email platforms, enterprise messaging platforms, enterprise business tool platforms such as enterprise accounting or enterprise human resources management platforms, enterprise legacy system platforms such as enterprise legacy payroll system platforms, enterprise collaboration platforms such as enterprise conference or enterprise teleconference or enterprise e-conference platforms, for example, enterprise application 142. Enterprise server 140 further represents a computing platform that may host one or more enterprise database management systems, for example, enterprise database 144.

In an exemplary embodiment, enterprise application 142 may represent an enterprise social media platform, for example, IBM Connections®, or may represent an enterprise email or enterprise messaging platform, for example, IBM Notes® or IBM Sametime®. Activities of the user on the social media platform may be stored as social media history information, as previously described.

In an exemplary embodiment, enterprise database 144 represents a database management system that may be used to handle information regarding individuals, such as employees, contractors, and other personnel of an enterprise. Enterprise database 144 may include information regarding individuals of an enterprise, such as the types of information maintained with respect to a human resource management system of the enterprise. Enterprise database 144 may also include psychometric information regarding individuals of an enterprise, relating to measurements of knowledge, abilities, attitudes, and/or personality or character traits which may be used by the enterprise to, for example, support the individuals' career development. Psychometric information regarding an individual may be obtained directly by, for example, administered tests, questionnaires, or assessments, including, for example, the Minnesota Multiphasic Personality Inventory (MMPI), the Five Factor model, the Myers-Briggs Type Indicator (MBTI) test, Belbin's Team Role Self Perception Inventory (BTRSPI) test, the human brain dominance indicator (HBDI) test. Enterprise database 144 may be used by an enterprise to, for example, support the enterprise's functions, and may be directed to specific functions of the enterprise, such as human resources or accounting.

User computing device 110 represents a computing platform that may host one or more software programs, for example, web browser 112, that a user may use to access resources over the internet.

In an exemplary embodiment, web browser 112 may be used to access resources over the internet, and may be used in conjunction with one or more software components, for example, one or more plug-ins, add-ons, gateways, portals, portlets, and/or applets.

Security management server 150 represents a computing platform that may host a resource access control computer program, for example, secure resource access manager 160, which may be used for controlling access to secure resources hosted on one or more computing platforms, for example, secure resource 182 hosted on secure resource server 180. Security management server 150 further represents a computing platform that may host a proxy, for example, secure resource proxy 172.

Secure resource access manager 160 represents a resource access control computer program that may determine levels of access to a secure resource, where the levels of access may relate to granting access, such as by authorizing, authenticating, approving, allowing, restricting, or denying access to secure resource 182 by a requestor, based on a determined security risk level score with respect to the requestor. Secure resource proxy 172 represents a computer program configured to act as an intermediary with respect to secure resource 182, by receiving requests for access to secure resource 182 from requestors, and by servicing access to the secure resource 182.

Secure resource access manager 160 receives and processes a request for access to secure resource 182 from secure resource proxy 172, and also receives and processes data mined with respect to the requestor's psychometric information, demographic information, and social media history information to determine potential security risks posed by the requestor with respect to the secure resource 182. Secure resource access manager 160 may determine levels of access with respect to access to the secure resource 182 by the requestor, based on the determined security risks posed by the requestor, where the levels of access may be serviced by secure resource proxy 172. In other embodiments, secure resource server 180 may act as the intermediary with respect to servicing access to the secure resource 182. Secure resource access manager 160 may include data miner module 162, cognitive security engine module 164, security risk level module 166, secure resource access monitor and controller module 168, and data storage 170.

In an exemplary embodiment, data miner module 162 periodically mines data for all enterprise users having access to secure resource 182, using social media application 122, demographics database 132, and enterprise application 142 and enterprise database 144. Data miner module 162 may use one or more crawlers or other programs and methods, such as by periodically running database queries, to retrieve the desired information. In certain embodiments, additional data may be mined, such as social media history for the contacts in a user's profile. Mined data may be stored in data storage 170 for retrieval and use by modules of secure resource access manager 160.

In various embodiments, data miner module 162 may mine data meeting certain criteria, such as data that may be used to produce information that may be useful in determining whether an individual poses a security risk with respect to secure resource 182. Such criteria may be determined, for example, based on best practices from security related industries, or may be imported from open source or proprietary sources.

In an exemplary embodiment, cognitive security engine module 164 receives mined data for a requestor of secure resource 182 from data storage 170, and generates a set of information, or a security profile, that is relevant to a determination of a security risk level. Cognitive security engine module 164 may include techniques and algorithms from Natural Language Processing (NLP), sentiment analysis, user behavioral analytics, classification engines, and other machine learning techniques.

Cognitive security engine module 164 is trained based on training data that is input to the cognitive security engine module, which may be classified in terms of known patterns of behavior and/or human factors information according to various predefined security criteria. Various classification algorithms or techniques may be used to classify the training data, which may involve the use of, for example, factor analyses algorithms, exploratory factor analyses algorithms, principal component analyses algorithms, neural networks, maximum likelihood estimation algorithms, various types of multivariate statistical methods, support vector machines, random forest, and/or deep feature synthesis algorithms. The appropriate choice of the training data, the classifications, and the predefined security criteria may be chosen as a matter of design choice, based, for example, on security industry best practices.

When cognitive security engine module 164 receives a request from secure resource proxy 172 to generate a set of security risk level information for a requestor, the cognitive security engine reads mined data for the requestor from data storage 170. Based on the training data and the various machine learning techniques used by cognitive security engine module 164, a set of security risk level information is generated. The generated set of security risk level information may include, for example, detected patterns of behavior based on social media history across one or more of the social media platforms, the content of the requestor's social media postings, human factors information such as evidence of certain emotional states based, for example, on the psychometric information, and/or changes to demographic information, and certain actions that may indicate violations of established security procedures.

Security risk level module 166 receives the security profile and determines a security risk level score with respect to the requestor. The security risk level score may include values for several security dimensions, such as access to different portions of secure resource 182, and whether various types of security related education are recommended or required. The security risk level score may be determined, for example, using a rule engine that may weight certain items and combinations of items in the set of security risk level information, in recognition that some of the items may be more or less indicative of a security risk.

In an exemplary embodiment, secure resource access monitor and controller module 168 receives a security risk level score with respect to a requestor from security risk level module 166, and in response to determining whether the security risk level score meets one or more predetermined threshold values, determines or sets levels of access to secure resource 182 by the requestor accordingly. Determined levels of access may be serviceable by secure resource proxy 172, to set or control the determined levels of access to secure resource 182 by the requestor. In other embodiments, secure resource server 180 may service access to the secure resource 182. Determined levels of access may be based on security risk level scores that meet one or more predetermined threshold values, which may be defined, for example, with respect to a spectrum of possible security risk level scores.

For example, predetermined threshold values may be defined in qualitative terms corresponding to low, intermediate, and high security risk level scores, where corresponding commands may relate to requiring the completion of education regarding security habits for low security risk level scores, restricting access to secure resource 182 to a degree for intermediate security risk level scores, and completely restricting access to secure resource 182 for high security risk level scores. Generally, the manner in which predetermined threshold values may be defined with respect to security risk level scores and corresponding commands may be a matter of design choice.

Figure 2:
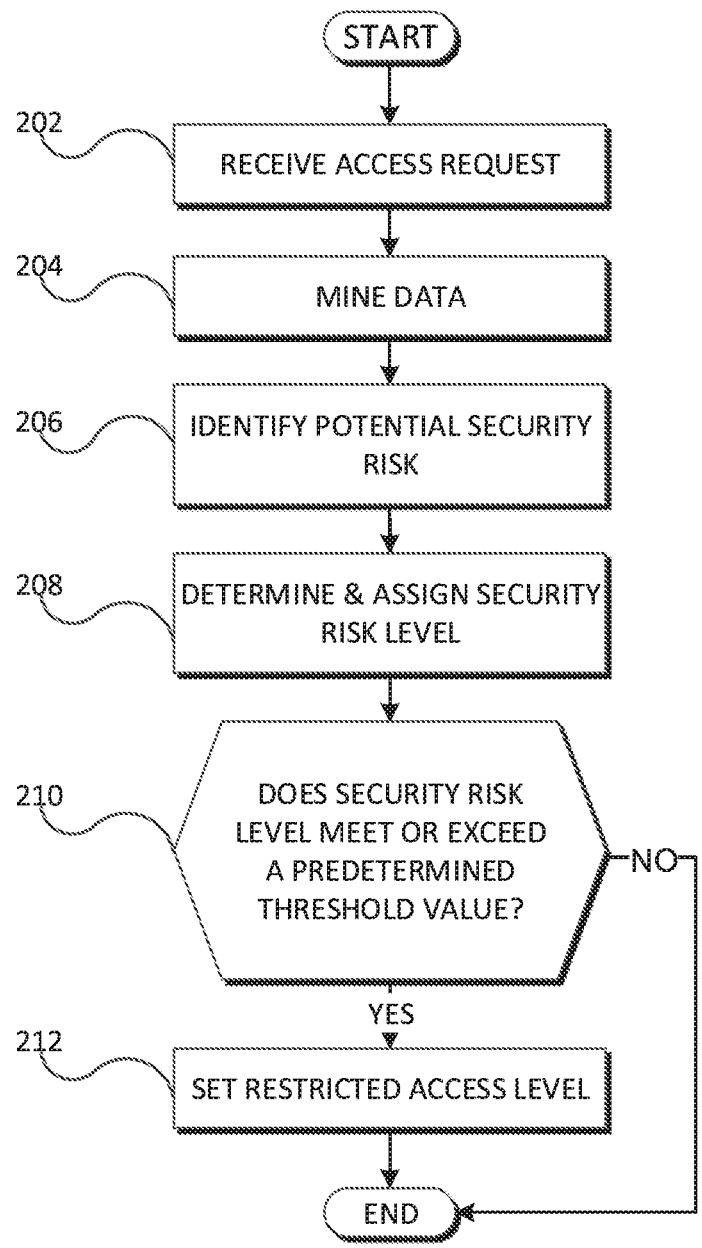
FIG. 2 is a flowchart depicting the operational steps of an aspect of the secure resource access manager program of FIG. 1, in accordance with an embodiment of the present invention.

FIG. 2 is a flowchart illustrating the operational steps of an aspect of security management system 100 of FIG. 1, in accordance with an embodiment of the present invention.

Secure resource proxy 172, residing on security management server 150, receives requests for access to secure resource 182 (step 202), residing on secure resource server 180, from requestors over network 102, where a requestor may send a request that includes an identifier of the requestor by way of web browser 112, residing on user computing device 110. Data miner module 162 of secure resource access manager 160, which may also be residing on security management server 150, periodically mines data with respect to enterprise users having access to secure resource 182 (step 204) from each of social media application 122 residing on social media server 120, demographics database 132 residing on demographics server 130, and enterprise application 142 and enterprise database 144 residing on enterprise server 140. Data mined may be stored on data storage 170 for later retrieval and use.

Cognitive security engine module 164 receives mined data with respect to each enterprise user having access to secure resource 182, and generates a corresponding security profile containing the mined data for each of the enterprise users. Cognitive security engine module 164 identifies and characterizes potential security risks and corresponding levels of security risk posed by a requestor, or an enterprise user who requests access to the secure resource 182, using the corresponding security profile of the requestor. Potential security risks may be identified in terms of detected patterns of behavior, and/or human factors information, exhibited by a requestor, which may be indicative of one or more potential security risks posed by the requestor (step 206). The patterns of behavior and/or human factors information relating to a requestor may be detected according to classified information regarding similar patterns of behavior and/or similar human factors information known to be indicative of one or more potential security risks that may be posed by an individual.

Security risk level module 166 receives security profiles of requestors and determines and associates corresponding security risk level scores to each of the security profiles of the requestors (step 208). A security risk level score may be based on information contained in the security profile of a requestor, with respect to each detected pattern of behavior and/or each detected human factors information of the requestor.

Secure resource access monitor and controller 168 receives security risk level scores and determines corresponding levels of access to secure resource 182. Determined levels of access may be serviced by secure resource server 180, and/or secure resource proxy 172, to control access to secure resource 182 by requestors according to the determined levels of access. The levels of access may be determined for security risk level scores that meet or exceed one or more predetermined threshold values (step 210, "yes" branch), where no action may be taken for the security risk level scores that do not meet or exceed one or more of the predetermined threshold values (step 210, "no" branch).

For a security risk level score of a requestor that meets or exceeds one or more predetermined threshold values, determined levels of access may be serviced to control access to secure resource 182 by the requestor accordingly (step 212). For example, high security risk level scores may be denied access, intermediate security risk level scores may have access restricted to an extent, and low security risk level scores may be allowed full access, pending completion of a task, where predetermined threshold values may be defined for each of the high, intermediate, and low security risk level scores, respectively. Other generated and communicated commands with respect to security risk level scores that meet or exceed one or more predetermined threshold values may relate to, for example, generating and communicating an alert to one or more system administrators, requiring the requestor to complete education regarding security habits, among others. For security risk level scores of requestors that do not exceed any predetermined threshold level of security risk, security management system 100 may take no action.

As depicted in FIG. 3, user computing device 110, social media server 120, demographics server 130, enterprise server 140, security management server 150, and secure resource server 180 may each include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, secure resource access manager 160, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Each of user computing device 110, social media server 120, demographics server 130, enterprise server 140, security management server 150, and secure resource server 180 may also include a R/W drive or interface 914 to read from and write to one or more portable computer readable storage media 926. Application programs 911 on any of user computing device 110, social media server 120, demographics server 130, enterprise server 140, security management server 150, and secure resource server 180 may be stored on one or more of the portable computer readable storage media 926, read via the respective R/W drive or interface 914 and loaded into the respective computer readable storage media 908. Each of user computing device 110, social media server 120, demographics server 130, enterprise server 140, security management server 150, and secure resource server 180 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology).

Application programs 911 on any of user computing device 110, social media server 120, demographics server 130, enterprise server 140, security management server 150, and secure resource server 180 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Server 230 may also include a display screen 920, a keyboard or keypad 922, and a computer mouse or touchpad 924.

Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

Each of, or some combination of, user computing device 110, social media server 120, demographics server 130, enterprise server 140, security management server 150, and secure resource server 180 can be a standalone network server, or represent functionality integrated into one or more network systems. In certain embodiments, each of, or some combination of, user computing device 110, social media server 120, demographics server 130, enterprise server 140, security management server 150, and secure resource server 180 represent computer systems utilizing clustered computers and components to act as a single pool of seamless resources when accessed through a network, such as a LAN, WAN, or a combination of the two. This implementation may be preferred for data centers and for cloud computing applications. In general, any of user computing device 110, social media server 120, demographics server 130, enterprise server 140, security management server 150, and secure resource server 180 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
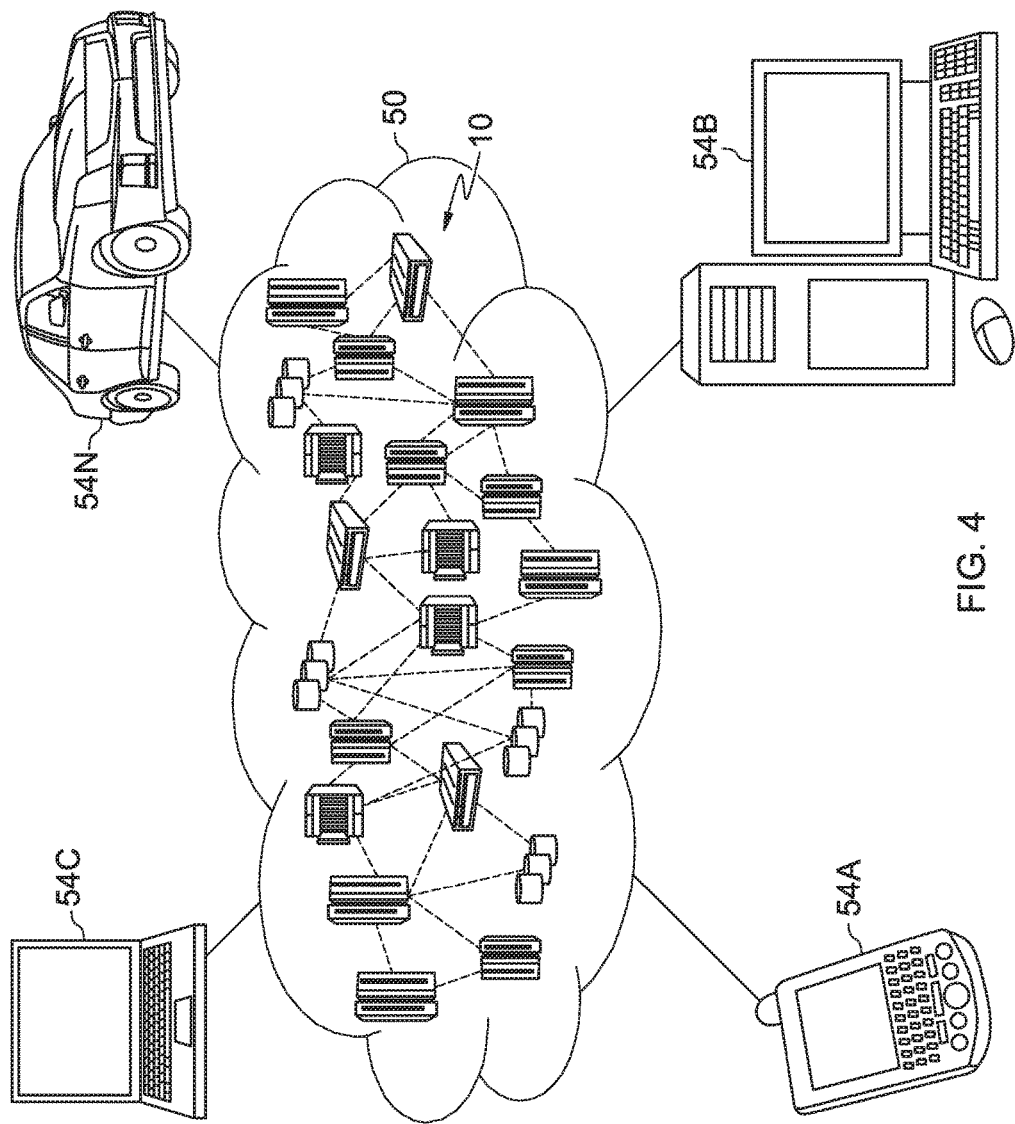
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 5:
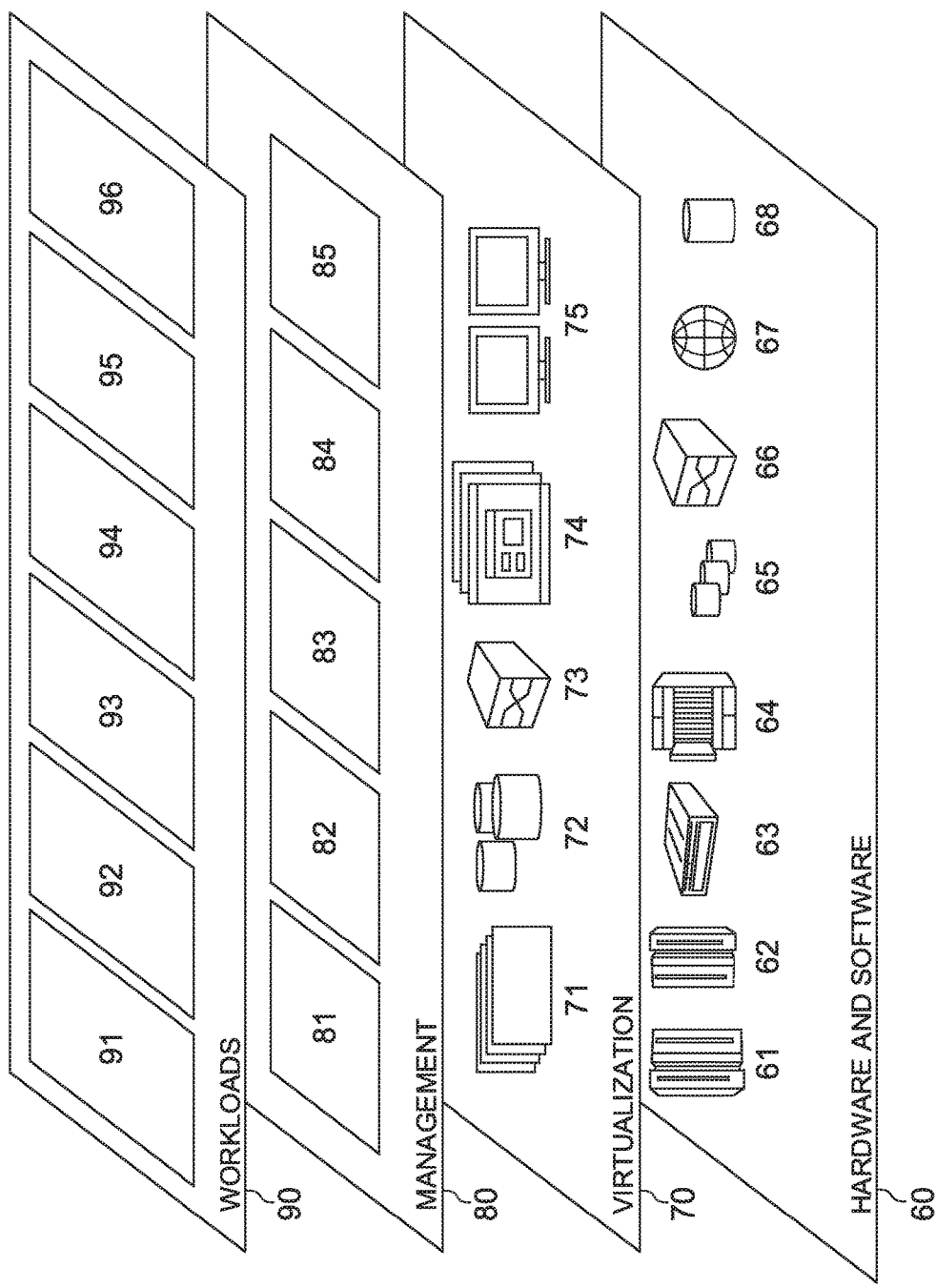
FIG. 5 depicts abstraction model layers, in accordance with an embodiment of the present invention.

Referring now to FIG. 5, a set of functional abstraction layers provided by cloud computing environment 50 (FIG. 1) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure resource access management 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for controlling access to a secure resource of an enterprise server, the method comprising:
   mining, by a computer system, data comprising social media history information, demographic information, and psychometric information with respect to a user having access to the secure resource;
   receiving, by a resource security proxy of the computer system from a user computing device, a user request for accessing the secure resource, wherein the resource security proxy serves as an intermediary between the user computing device and the secure resource;
   generating, by the computer system, a security profile for association with the user, wherein the security profile comprises the mined data, and wherein the security profile is generated by applying natural language processing, sentiment analyses, user behavioral analytics, and machine learning to the mined data;
   identifying, by the computer system, a potential security risk based on the mined data, wherein the potential security risk meets a predefined security criteria with respect to the secure resource;

generating, by the computer system, security risk level information in relation to the user with respect to the secure resource, the security risk level information generated based on the identified the potential security risk, wherein the generated security risk level information is added to the security profile;

determining, by the computer system, a security risk level score with respect to the user based on the generated security risk level information, wherein the security risk level score is determined based on: content of a social media posting by the user, an emotional state of the user, a change to the demographic information of the user, and an action by the user in violation of an established security procedure, wherein the emotional state of the user is determined based on the psychometric information stored on the enterprise server, wherein the psychometric information comprises psychometric test results associated with the user and psychometric measurements of an attitude and personality trait of the user;

in response to determining, by the computer system, that the determined security risk level score meets one or more predetermined threshold values, setting a level of access to the secure resource by the user computing device based on the one or more predetermined threshold values that are met; and granting, by the resource security proxy of the computer system in accordance with the set level of access, access to the secure resource by the user associated with the received request.

* * * * *